United States Patent
Sakae

[19]

[11] Patent Number: 5,954,851
[45] Date of Patent: Sep. 21, 1999

[54] METHOD FOR PREHEATING GLASS BATCH

[76] Inventor: Seiji Sakae, 3-2008-100 Miyamachi, Tondabayashi-shi, Osaka-fu 584, Japan

[21] Appl. No.: 08/941,847

[22] Filed: Oct. 1, 1997

[30] Foreign Application Priority Data

Oct. 2, 1996 [JP] Japan .................................. 8-297006

[51] Int. Cl.⁶ .............................. C03B 5/237; C03B 1/00
[52] U.S. Cl. ....................... 65/134.6; 65/136.1; 110/204; 165/904; 432/175; 432/176
[58] Field of Search ................. 65/134.6, 135.9, 65/136.1; 110/204; 165/904; 432/175, 176

[56] References Cited

U.S. PATENT DOCUMENTS

| | | | |
|---|---|---|---|
| 3,880,639 | 4/1975 | Bodner et al. ............................ | 65/134 |
| 4,045,197 | 8/1977 | Tsai et al. .................................. | 65/27 |
| 4,184,861 | 1/1980 | Erickson et al. ........................... | 65/27 |
| 4,292,064 | 9/1981 | Propster .................................... | 65/27 |
| 4,310,342 | 1/1982 | Richards .................................... | 65/27 |
| 4,319,903 | 3/1982 | Hohman et al. ........................... | 65/27 |
| 4,338,112 | 7/1982 | Propster .................................... | 65/27 |
| 4,875,919 | 10/1989 | DeSaro et al. ............................. | 65/27 |
| 4,973,346 | 11/1990 | Kobayashi ................................. | 65/135 |
| 5,057,133 | 10/1991 | Chen et al. ................................. | 65/27 |
| 5,399,181 | 3/1995 | Sorg ........................................... | 65/27 |
| 5,571,301 | 11/1996 | Yamaura et al. .......................... | 65/335 |
| 5,713,977 | 2/1998 | Kobayashi ............................. | 65/134.6 |
| 5,741,342 | 4/1998 | Alexander ............................. | 65/136.1 |

*Primary Examiner*—Peter Chin
*Assistant Examiner*—Jacqueline A. Ruller
*Attorney, Agent, or Firm*—Brown Raysman Millstein Felder & Steiner LLP

[57] ABSTRACT

A method and apparatus for efficiently preheating glass batch utilizing waste gas from a glass melting furnace is provided. In a method and apparatus for preheating glass batch utilizing hot waste gas discharged from a glass melting furnace before glass batch is inputted thereto, a heat exchanger 30A for heating heat medium gas located in a waste gas flue 12A and a glass batch preheater 20A located on the upstream side of a batch input port 11A are communicated by means of an inline duct 31A and an outline duct 32A to form a heat medium gas circulating circuit. Clean gas having heat radiation intensity in the infrared ray wavelength range such as carbon dioxide or water vapor is enclosed in the circuit as the heat medium and is forced to endlessly circulate and go round in the circuit by a blower 33A located in the outline duct thereby to preheat glass batch and, at the same time, to cool hot waste gas to appropriate temperature.

6 Claims, 6 Drawing Sheets

METHOD FOR PREHEATING GLASS BATCH

BACKGROUND OF THE INVENTION

1. Field of the Invention

The present invention relates to a method and apparatus for preheating glass batch before being inputted to a glass melting furnace.

2. Description of the Related Art

Because a glass melting furnace consumes a large quantity of thermal energy, various energy-saving measures have been put into practice. However, the quantity of heat taken away by waste gas from a melting furnace remains to be at a high level corresponding to more than 20% of the inputted fuel, and thus, as a powerful means for effectively utilizing the waste heat, it has been a big problem for the glass manufacturing industry to put preheating glass batch with waste gas to practical use. In spite of this, the actual situation is that the preheating has not reached the level of practical use. In the following, prior art and the reason that the technology is prevented from being put to practical use are described.

As a conventional method for preheating glass batch, both a direct heating method and an indirect heating method have been proposed. The direct heating method has an advantage that the efficiency of heat transfer is higher and the apparatus can be miniaturized that much more, since waste gas is forced to pass through a glass batch layer and heat is transferred directly. However, since waste gas discharged from a glass melting furnace is contaminated waste gas containing volatile glass component and combustion product of fuel, when these contaminants get in contact to cool glass batch or moisture attached thereto, for example, in case of bottle glass using Glauber's salt as the refining agent, $Na_2SO_4$, $Na_2S_2O_7$, $NaHSO_4$, and sulfuric acid are produced, which contaminate the glass batch to lower the quality of the glass and corrode metal constituting the apparatus. There are many other problems, for example, the necessity of reinforcing a dust collector and larger pressure loss of the waste gas, because of fine powder batch scattered and mixed in the waste gas. On the other hand, according to an indirect heating method, since glass batch is heated by "contaminated waste gas" via heating tubes, there are advantages that problems such as contamination of glass batch by "contaminated waste gas," damage by acid of the apparatus, and increase in the amount of dust can be avoided, and the pressure loss of the waste gas is small. However, on the other hand, there are problems that volatile glass component and combustion product of fuel contained in waste gas from a glass melting furnace attach to the inner face of the heating tubes to lower the efficiency of heat transfer and clogs a path of waste gas. Further, some of the attaching substances are welded to the inner face of the heating tubes at 400° C. or below, and it is quite difficult to remove the attaching substances during operation of the apparatus.

As mentioned in the above, in a conventional technology of preheating glass batch, both a direct heating method and an indirect heating method adopt introduction of "contaminated waste gas" itself containing a large amount of contaminants into a batch preheater as the heat source. This makes a glass melting system with a batch preheater installed therein to have difficult problems given in the above. More specifically, in a conventional method in which "contaminated waste gas" is directly introduced into a batch preheater, the advantage that energy is saved by collecting waste heat is overwhelmed by the disadvantages that are caused with respect to, for example, the maintenance and operation of the equipment and the quality of the glass, which loses appeal of preheating glass batch. In conclusion, it can be said that to care conventionally that "contaminated waste gas" itself containing a large amount of contaminants is directly introduced into a batch preheater prevents preheating of glass batch from being put to practical use.

Further, nowadays there is a tendency that, from a standpoint of an antipolution measure, a glass melting furnace by pure oxygen combustion is adopted. In this case, since, different from a conventional furnace, preheating of combustion air can not be used as a means for recovering waste heat, the actual situation is that thermal energy of hot waste gas is discharged to the atmosphere without being effectively utilized. Application to preheating glass batch of waste heat of an oxygen combustion glass melting furnace is now described in the following.

When glass batch is preheated utilizing waste heat from a glass melting furnace, the waste gas to be introduced into a batch preheater is required to be 600° C. or below so that glass cullet is not fused and solidified. In case of a conventional air combustion glass melting furnace, since a regenerator or a recuperater (such as heat exchanger made of metal) for preheating combustion air is located for recovering waste heat, the temperature of the waste gas is lowered to about 500° C. in case of a regenerator and about 600° C. in case of a recuperater, and accordingly, the waste gas can be introduced into a batch preheater with the temperature unchanged. However, in case of an oxygen combustion grass melting furnace, since there is no need to pretreat combustion air, recovery of waste heat must be attained by some other process. However, since an appropriate waste heat recovering apparatus to take the place of preheating has not yet been developed, the actual situation is that waste gas as hot as 1450° C. or above is discarded.

In case glass batch is preheated in an oxygen combustion glass melting furnace system, the waste gas to be introduced into a batch preheater is required to be cooled anyhow to 600° C. or below. However, cooling by dilution with ordinary temperature air leads to increase of the amount of the waste gas, and thus the meaning of adopting oxygen combustion from a standpoint of an antipolution measure is lost. An apparatus for preheating glass batch utilizing waste heat from an oxygen combustion glass melting furnace has not yet been put to practical use.

In the above context, with regard to glass melting furnace including an oxygen combustion glass melting furnace, to put a glass batch preheater to practical use is to materialize an effective means contributing not only to reduction of consumption of fuel used to melt glass and to reduction of Nox but also to reduction of carbon dioxide production due to combustion. In view of the above the present invention provides a new glass batch preheater, developed for the purpose of application to an oxygen combustion glass melting furnace which is expected to prevail in the future, not to mention a conventional regenerative or recuperative glass melting furnace.

Accordingly, a problem to be solved by the present invention is to develop a method and apparatus for preheating glass batch satisfying the following items:

(1) Without adopting a conventional method of introducing "contaminated waste gas" which contaminates glass batch and which makes dust attach and deposit to the inner face of heating tubes directly into a batch preheater, a clean heat medium gas with high heat transfer efficiency heated by hot "contaminated waste gas" shall be used as an alternative heat source, and the apparatus shall not adversely influence the glass quality, nor shall it require maintenance such as dust cleaning;

(2) The method shall reheat heat medium gas by endlessly circulating it in order to improve heat recovery from waste gas and to make the heat medium gas as hot as possible;

(3) Since glass batch typically contains 3–5% of moisture end water vapor produced by heating batch recondenses in a specific batch layer in a low temperature range causing solidification in mass of grass batch at the recondensing point resulting in clogging a channel of gravitationally dropping batch, the apparatus shall be constructed such that produced water vapor is promptly discharged.

(4) In order to prevent solidification of batch and to facilitate heat transfer, a heating chamber of a batch preheater shall be constructed such that gravitationally dropping batch layers exhibit gentle dispersion phenomenon; and (5) Adding the present apparatus shall not substantially influence the equipment, operation, and the like of a conventional glass melting furnace.

Figure 1:
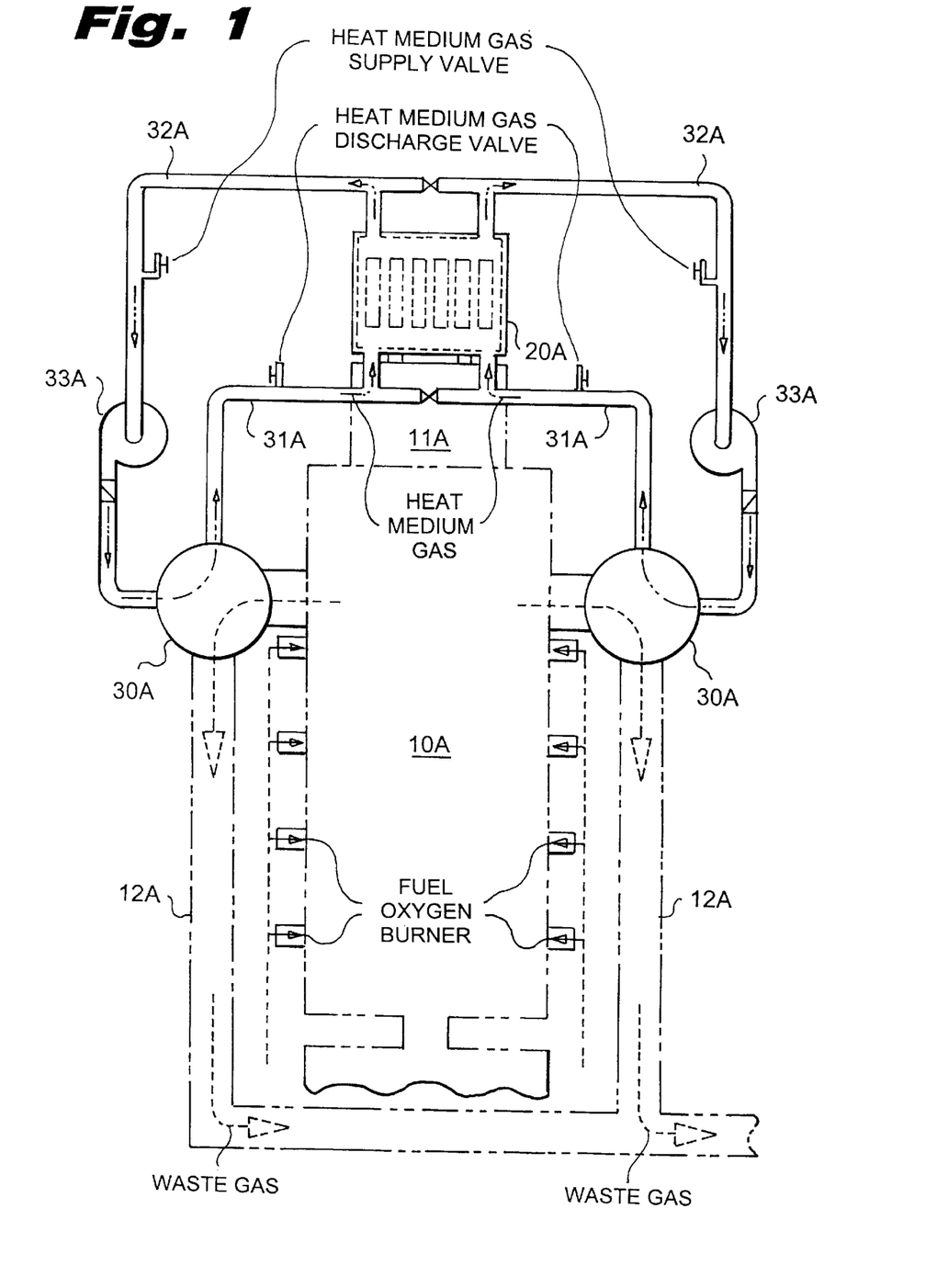
FIG. 1 is a flow chart of an oxygen combustion glass melting system showing an embodiment of the present invention.
Figure 2:
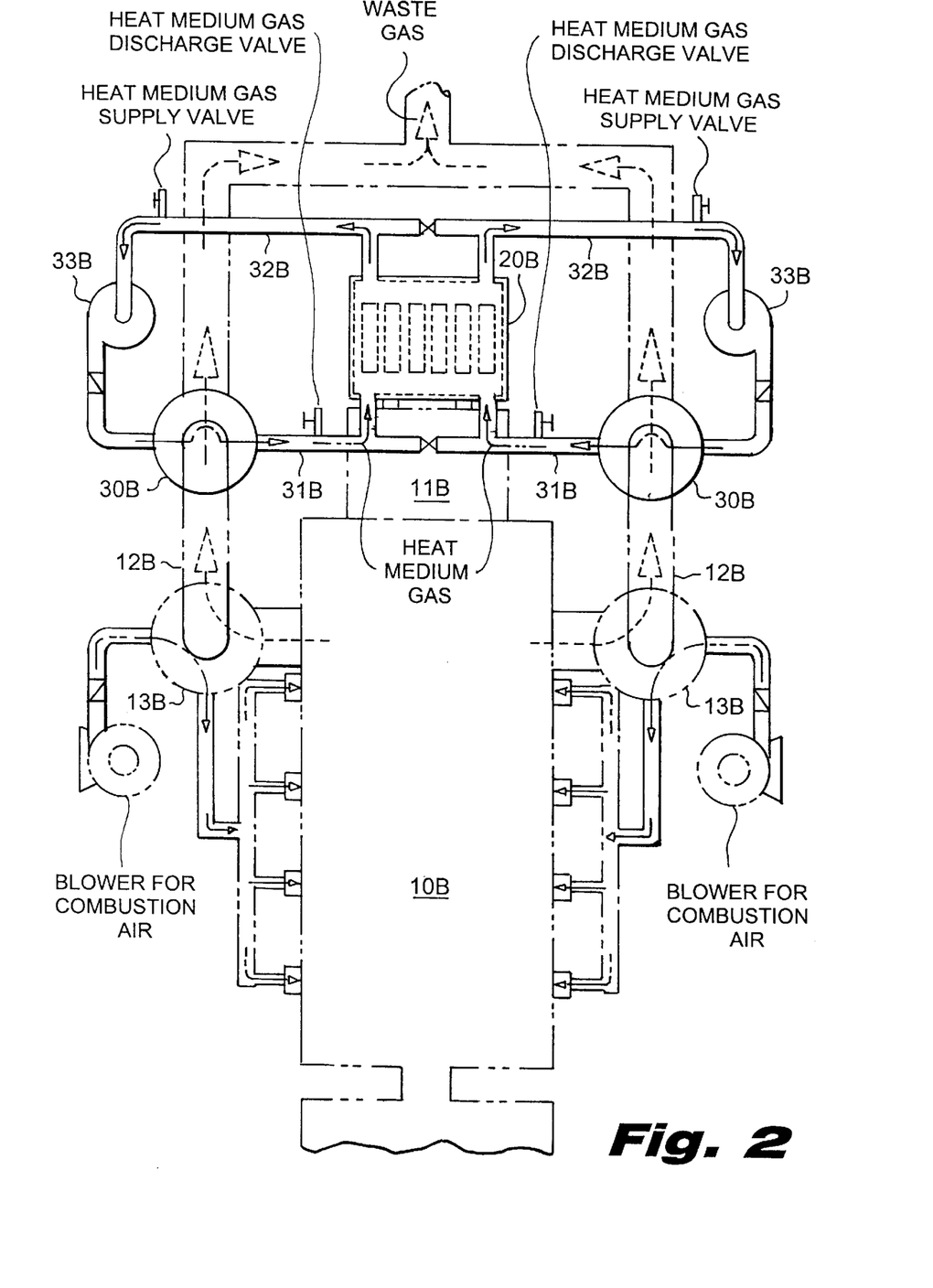
FIG. 2 is a flow chart of a glass melting system with a heat exchanger made of metal showing another embodiment of the present invention.
Figure 3:
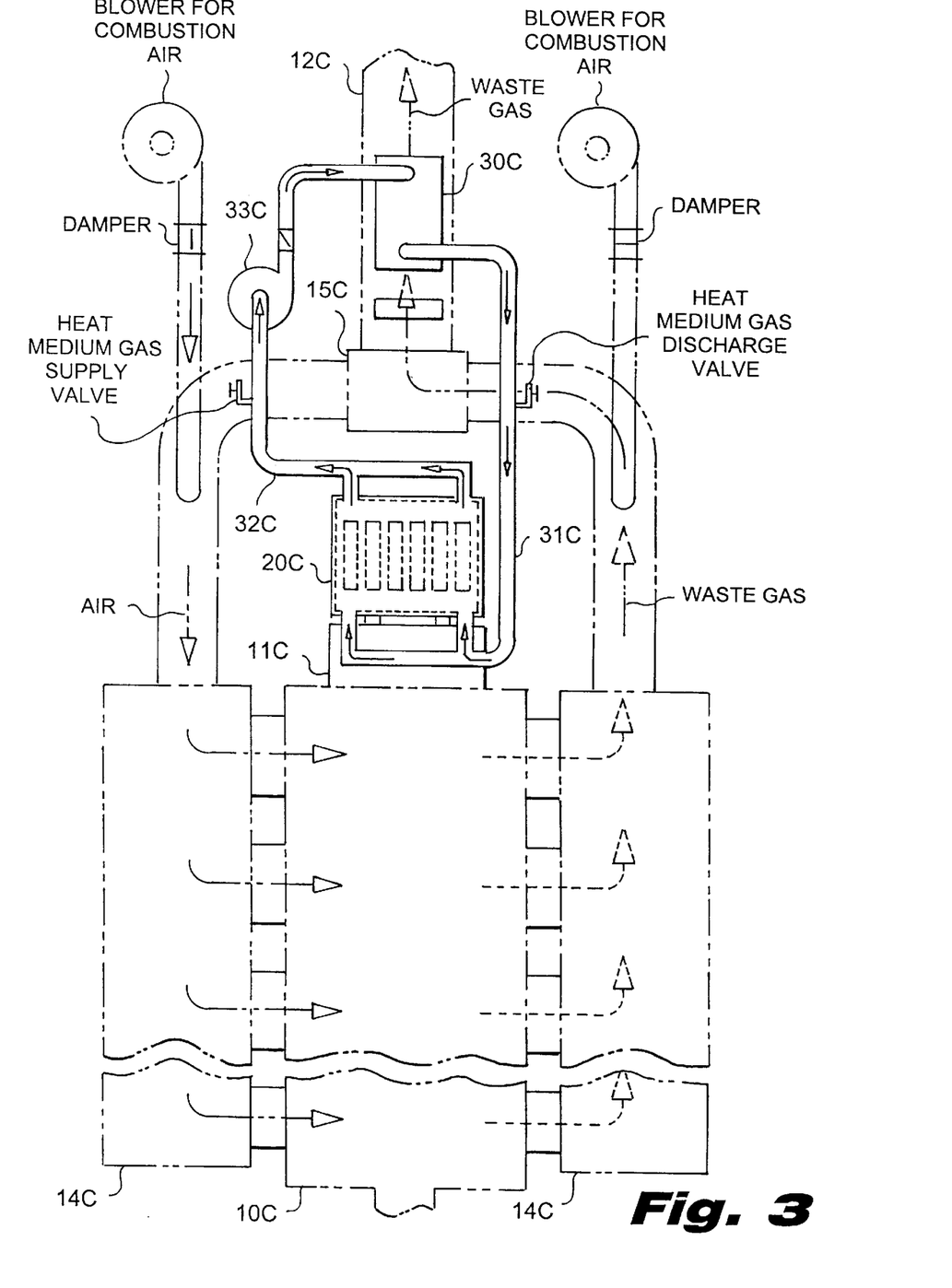
FIG. 3 is a flow chart of a glass melting system with a regenerator showing still another embodiment of the present invention.

In order to attain the above-mentioned object, according to the present invention, as shown in FIGS. 1 to 3, in a method for preheating glass batch utilizing waste heat of hot gas discharged from a glass melting furnace before glass batch is inputted to the furnace, instead of introducing hot "contaminated waste gas" directly into a glass batch preheater, carbon dioxide or water vapor having heat radiation intensity in the infrared ray wavelength range is used as the heat medium. The heat medium is heated by a heat exchanger for recovering waste heat (hereinafter referred to as heat exchanger for heating heat medium gas or simply as heat exchanger) located in a waste gas flue of the furnace and is introduced via an inline duct of a circulating circuit into a glass batch preheater to preheat glass batch. The heat medium gas remains 200° C. or above even after exiting the batch preheater, and returns via a blower provided in the middle of an outline duct of the circulating circuit to the heat exchanger to be heated to raise its temperature. Hotter heat medium gas could be successfully obtained by this method in which the heat medium gas is endlessly circulated to be reheated. By using the hotter heat medium gas as the heat source for preheating glass batch, the above-mentioned various problems caused according to a conventional method, that is, a method in which "contaminated waste gas" containing volatile glass component and combustion product of fuel is directly introduced into a batch preheater could be solved.

Further, by using heat radiative (heat absorbent) gas such as carbon dioxide or water vapor as the heat medium for preheating glass batch, when heat is absorbed from waste gas by the heat medium gas in a heat exchanger or when heat is emitted to batch in a glass batch preheater, not only conduction and convection, but also radiation contributes to heat transfer (in case air is used, heat is not transferred by radiation), and thus, rate of heat transfer is increased, and as a result, the equipment could be miniaturized.

It is to be noted that, though, other than carbon dioxide and water vapor, $SO_2$, CO, $NH_3$, Hcl, hydrocarbon of various kinds, and the like are gases having heat radiation (absorption) intensity in the infrared ray wavelength range, the most suitable heat medium gases for an apparatus of the present invention are carbon dioxide and water vapor, and either one is singly used or both are mixedly used. Since air ($N_2$ and $O_2$) does not radiate (absorb) heat and is therefore inappropriate for heat medium gas, and since lowered partial pressure of heat medium gas leads to weaker heat radiation intensity, the equipment is constructed such that air does not come in the circulating circuit.

Further, in order to prevent water vapor produced by heating wet batch from recondensing in a specific batch layer in a low temperature range causing solidification in mass of batch at the recondensing point resulting in clogging a channel of batch, the bottom of each heating tube is constructed to be flat or concave such that a cavity which is U-shaped in cross section is formed in a batch layer right under each heating tube by angle of repose of gravitationally dropping batch to collect water vapor in the cavity and to promptly suck and discharge it to the outside via an exhaust pipe.

Each step of the heating tubes in the glass batch preheater is preferably about 650 mm or less in height in an upper zone (drying zone) of a heating chamber, and about 650 mm or more in height in a lower zone (heating zone). The total number of the heating tubes and the number of steps of the heating tubes are set depending on various conditions such as the quantity of preheat of glass batch, the quantity of attached moisture, and the kind and composition of batch. Particularly, with respect to the upper zone (drying zone) of the heating chamber, the number and arrangement of the heating tubes are required to be decided with complete vaporization of moisture in glass batch (typically 3–5% of moisture is contained) and rising temperature of batch itself to the boiling point of water or above being as essential conditions. Since, depending on the composition of glass batch, glass batch sometimes separates and vaporizes constitution water at 500° C. or above and is sometimes decomposed to produce gas, for the purpose of discharge them to the outside, a gas exhaust pipe is attached at the bottom of each heating tube in the lower zone similarly to the upper zone. The heating tubes in the upper zone and in the lower zone are similar in shape except for the height.

Further, in order to make gravitationally dropping batch layers exhibit gentle dispersion phenomenon to prevent solidification of batch and to facilitate heat transfer, the heating tubes in the heating chamber are arranged to be staggered step by step in the direction of the height to make the gravitationally dropping batch layers repeat dispersion at the apices of the heating tubes of each step. As a result, the particles of batch did not grow in mass to clog a channel of batch. Further, the dispersion of batch led to equalization of temperature of batch resulting in higher efficiency of heat transfer.

Still further, according to the present apparatus, since waste gas from the glass melting furnace need not round to the glass batch preheater to be introduced as the heat source, adding the present apparatus does not substantially influence the equipment, operation, and the like of a conventional glass melting furnace. If forced to mention, since a heat exchanger for heating heat medium gas is located in a waste gas flue of the furnace, the pressure loss of waste gas through it becomes a burden of an existing exhauster. However, since a heat exchanger operable within the surplus capacity of the exhauster is selected, the existing furnace equipment is not substantially influenced.

DETAILED DESCRIPTION OF THE INVENTION

Embodiments of the present invention are now described in the following with reference to the drawings.

Figure 4:
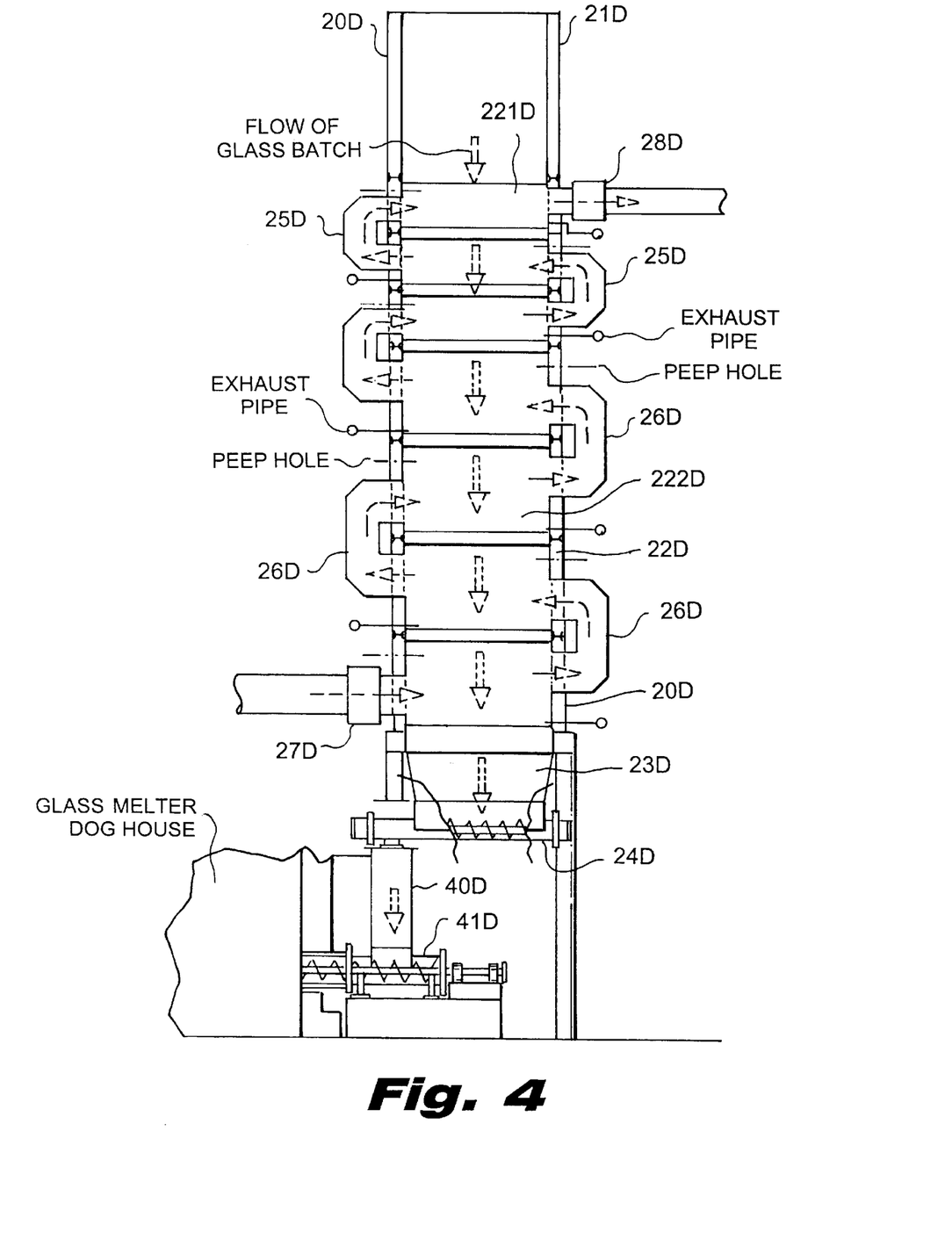
FIG. 4 is a schematic longitudinal sectional view of a batch preheater according to the present invention.
Figure 5:
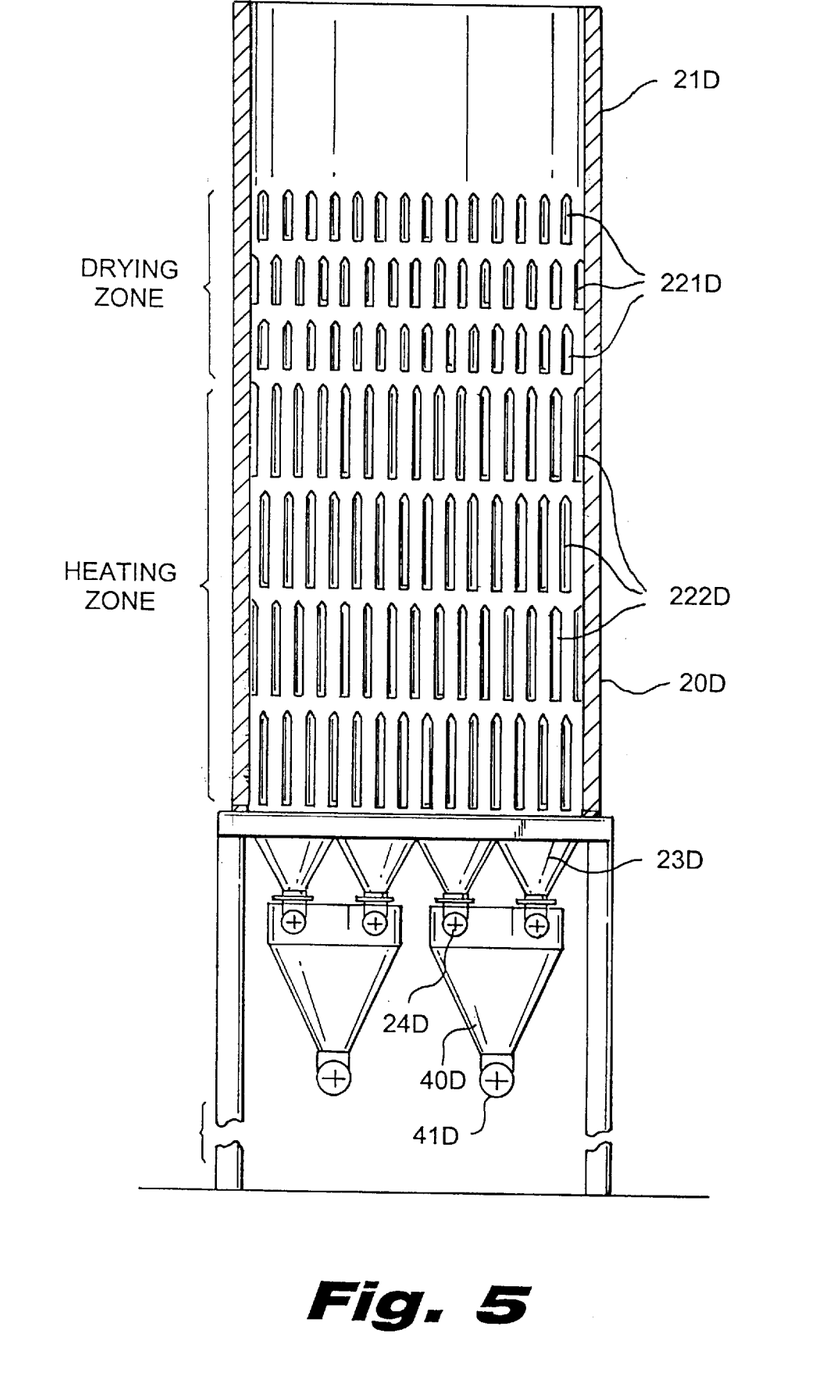
FIG. 5 is a schematic transverse sectional view of the batch preheater according to the present invention.
Figure 6:
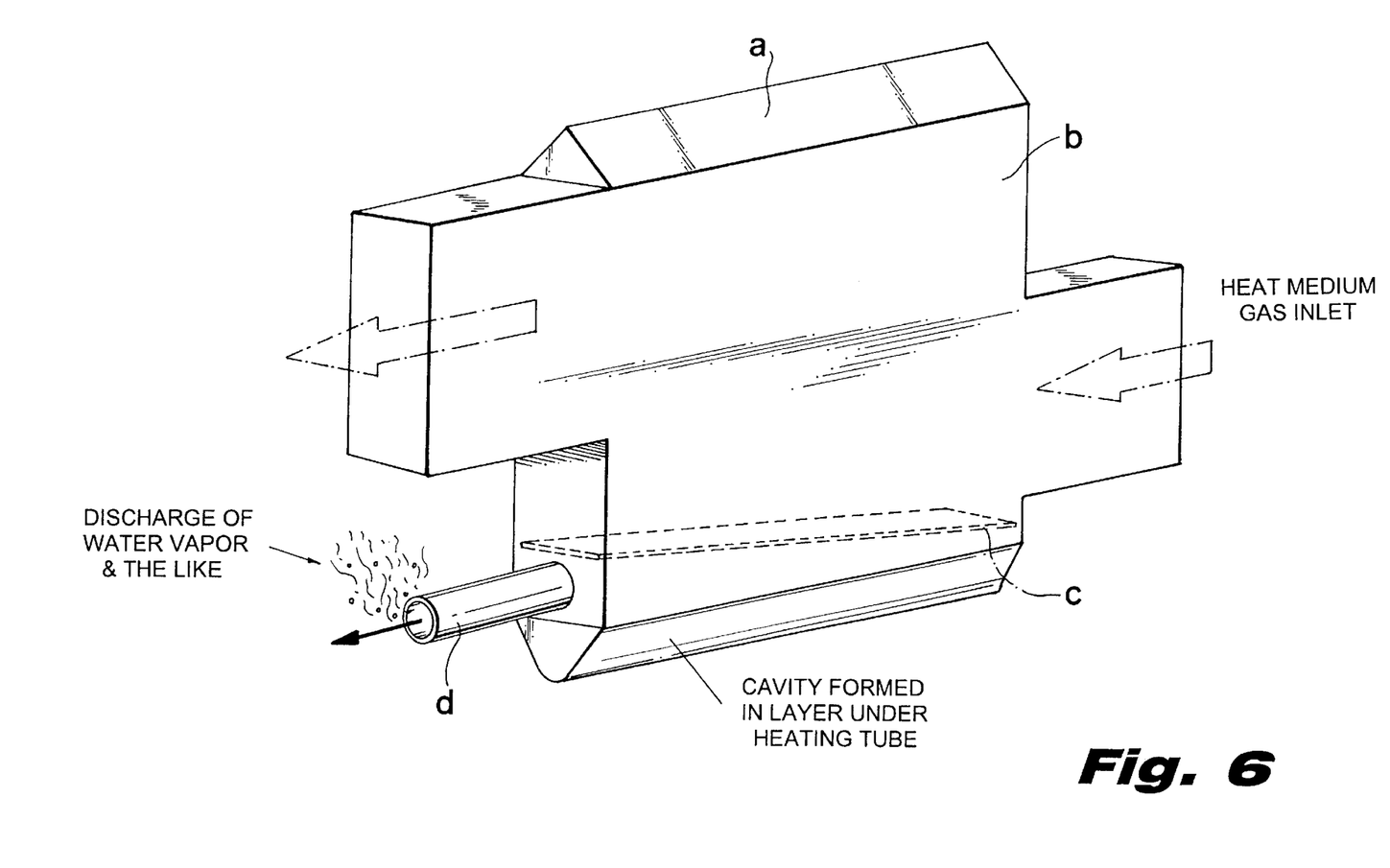
FIG. 6 is a schematic perspective view of a heating tube of the batch preheater according to the present invention.

FIGS. 1 to 6 show embodiments of the present invention. FIGS. 1 to 3 are flow charts of systems in which an apparatus for preheating glass batch according to the present invention is applied to existing typical methods of melting glass. FIGS. 4 to 6 schematically show the construction of a glass batch preheater according to the present invention.

(Embodiment 1)

FIG. 1 shows an example of flow in a system in which a glass batch preheater according to the present invention is located in an oxygen combustion glass melting furnace. Specifically, a glass batch preheater 20A is located on the upstream side of a batch input port 11A of an oxygen combustion glass melting furnace 10A, a heat exchanger 30A for heating heat medium gas is located in a waste gas flue 12A, and the glass batch preheater 20A and the heat exchanger 30A are communicated by means of an inline duct 31A and an outline duct 32A for circulating heat medium gas. A blower 33A for circulating heat medium gas is located in the outline duct 32A. Glass batch inputted from the top of the glass batch preheater 20A by a skip hoist (not shown) or the like is heated to be dried while fluidly dropping through the glass batch preheater 20A due to its own weight, is discharged by a screw conveyor (not shown) attached to the lower portion of the glass batch preheater 20A, and is supplied into the furnace via a batch charger (not shown). Heat medium gas is first blown into the heat exchanger 30A by the blower 33A to be heated to 550–600° C. by hot waste gas at 1450° C. or above discharged from the glass melting furnace 10A, is introduced into the glass batch preheater 20A via the inline duct 31A to heat glass batch to 250–320° C., and then returns to the heat exchanger 30A via the blower 33A in the outine duct 32A with its temperature still maintained at 200–250° C. Heat medium gas endlessly circulates and goes round in the circuit repeating absorption and radiation of heat to preheat glass batch and, at the same time, to cool hot waste gas to appropriate temperature.

(Embodiment 2)

FIG. 2 shows an example of flow in a system in which a glass batch preheater according to the present invention is located in a conventional glass melting furnace with a heat exchanger made of metal, that is, what is called a "unit melter." Specifically, a glass batch preheater 20B is located on the upstream side of a batch input port 11B of a glass melting furnace 10B, a heat exchanger 30B for heating heat medium gas is located in a waste gas flue 12B on the downstream side of a heat exchanger 13B for preheating combustion air, and the glass batch preheater 20B and the heat exchanger 30B for heating heat medium gas are communicated by means of an inline duct 31B and an outline duct 32B for circulating heat medium gas. A blower 33B for circulating heat medium gas is located in the outline duct 32B. Glass batch inputted from the top of the glass batch preheater 20B by a skip hoist (not shown) or the like is heated to be dried while fluidly dropping through the glass batch preheater 20B due to its own weight, is discharged by a screw conveyor (not shown) attached to the lower portion of the glass batch preheater 20B, and is supplied into the furnace via a batch charger (not shown). Heat medium gas is first blown into the heat exchanger 30B for heating heat medium gas by the blower 33B to be heated to 550–600° C. by hot waste gas after heating combustion air in the heat exchanger 13B for preheating combustion air, is introduced into the glass batch preheater 20B via the inline duct 31B to preheat glass batch to 300–380° C., and then returns to the heat exchanger 30B via the blower 33B located in the outine duct 32B with its temperature still maintained at 200–250° C. Heat medium gas endlessly circulates and goes round in the circuit repeating absorption and radiation of heat to preheat glass batch and, at the same time, to cool hot waste gas to appropriate temperature.

(Embodiment 3)

FIG. 3 shows an example of flow in a system in which a glass batch preheater according to the present invention is located in a conventional glass melting furnace with a regenerator. Specifically, a glass batch preheater 20C is located on the upstream side of a batch input port 11C of a glass melting furnace 10C, a heat exchanger 30C for heating heat medium gas is located in a waste gas flue 12C, and the glass batch preheater 20C and the heat exchanger 30C for heating heat medium gas are communicated by means of an inline duct 31C and an outline duct 32C. A blower 33C for circulating heat medium gas is located in the outline duct 32C. Glass batch inputted from the top of the glass batch preheater 20C by a skip hoist (not shown) or the like is heated while fluidly dropping through the glass batch preheater 20C due to its own weight, is discharged by a screw conveyor (not shown) attached to the lower portion of the glass batch preheater 20C, and is supplied into the furnace via a batch charger (not shown). Heat medium gas is first blown into the heat exchanger 30C by the blower 33C to be heated to 350–400° C. by hot waste gas which went through a regenerator 14C and a waste gas reversing damper 15C, is introduced into the glass batch preheater 20C via the inline duct 31C to preheat glass batch to 250–300° C., and then returns to the heat exchanger 30C via the blower 33C located in the outine duct 32C with its temperature still maintained at about 200° C. Heat medium gas endlessly circulate and go round in the circuit, repeating absorption and radiation of heat to preheat glass batch and, at the same time, cooling hot waste gas to appropriate temperature.

(Embodiment 4)

An apparatus for preheating glass batch according to the present invention comprises, as described with respect to Embodiments 1 to 3, a heat exchanger for heating heat medium gas, a glass batch preheater, an inline duct and an outline duct for connecting the heat exchanger and the glass batch preheater, a blower for circulating heat medium gas, and the like. The features of the construction of a glass batch preheater 20D, which is a main portion of the apparatus for preheating glass batch and is a feature of the present invention, are now described in the following based on FIGS. 4 to 6.

The glass batch preheater 20D comprises a storage tank 21D, a heating chamber 22D, a lower hopper 23D, a screw conveyor 24D, and ducts 25D (in a drying zone) and ducts 26D (in a heating zone) for connecting the respective heating tube units.

The heating chamber 22D is rectangular in cross section and is formed by two zones: one for drying glass batch and the other for heating glass batch. A plurality of steps and rows of heating tubes 221D and 222D which are different in height depending on the zone are arranged to be staggered step by step and to horizontally pierce the heating chamber 22D. In each step, the heating tubes are made to be as one unit.

Each heating tube 221D or 222D is, as shown in FIG. 6, formed such that an apex a is gable-roof-shaped to permit smooth fluid drop of glass batch and such that a base plate c is horizontal or longitudinally inclined with respect to both side plates b to go into the heating tube that much to be fixed. An exhaust pipe d is attached to a longitudinal end of a cavity formed by the base plate c and angle of repose of fluidity dropping batch to suck and discharge to the outside water vapor and the like produced by heating wet batch. Preferably, the inside measurement in width of a heating tube is about 100 mm, and the height of a heating tube is 650 mm or less in the drying zone and 650 mm or more in the heating zone.

The heating tube units at the respective steps in the heating chamber 22D of the batch preheater form a chain of gas channels by connecting duct 25D, 26D. Heat medium gas is introduced from a connecting port (inlet) 27D with an inline duct provided at a heating tube unit at a lower step, and via the respective heating tube units, returns to an outline duct from a connecting port (outlet) 28D at an upper step.

Heated glass batch goes through a hopper 23D at the lower portion of the heating chamber 22D and is discharged by a screw conveyer 24D to be supplied into a glass melting furnace via an charging hopper 40D and a screw charger 41D.

All of the batch preheaters 20A, 20B, and 20C shown in FIGS. 1 to 3 have the construction and features described with reference to FIGS. 4 to 6.

As described in the above, according to the present invention, since clean heat medium gas heated by hot "contaminated waste gas" discharged from a glass melting furnace endlessly circulates and goes round to preheat glass batch via heating tubes, glass is not contaminated by waste gas and maintenance such as dust cleaning is not required. Further, by using heat radiative gas as the heat medium, the efficiency of heat transfer is made higher and the apparatus is successfully miniaturized. The heating tubes in the glass batch preheater are arranged to be staggered in the direction of the height such that batch layers dropping due to their own weight flow staggeringly to exhibit gentle dispersion phenomenon thereby to facilitate heat transfer in the batch layers and to prevent solidification of batch. Further, an exhaust pipe is provided at the bottom of each heating tube to promptly suck and discharge to the outside water vapor produced by preheating wet glass batch thereby to prevent water vapor from recondensing in a batch layer causing solidification in mass of batch resulting in clogging a channel of batch. Still further, in case of an oxygen combustion glass melting furnace, since waste gas as hot as 1450° C. or above is discharged from the furnace, it is necessary to cool waste gas to 250–300° C. to introduce it into an electric dust collector. By providing the present apparatus, preheating of glass batch and cooling of waste gas can be attained at the same time.

By providing a glass batch preheater according to the present invention, with respect to an oxygen combustion glass melting furnace, glass batch is preheated to 250–320° C. to attain saving energy of 16–20%, and with respect to a conventional type glass melting furnace, glass batch is preheated to 250–380° C. to attain saving energy of 16–23%.

Because the glass batch made according to the present invention is free of contamination, the present invention may also be used in a conventional manner to manufacture fine glass products by using the glass batch.

While a number of embodiments have been disclosed, it should be appreciated that this disclosure is for purposes of illustration and the invention is not limited to implementation in the particular manner described.

What is claimed is:

1. A method for preheating glass batch, utilizing hot waste gas discharged from a glass melting furnace before the glass batch is inputted thereto, comprising the steps of:

forming a clean heat medium gas circulating closed circuit by communicating a heat exchanger for recovering waste heat, being located in a waste gas flue, and a glass batch preheater and enclosing in said circuit clean heat medium gas having a heat radiation intensity in an infrared ray wavelength range as the heat medium, said clean heat medium gas being confined in said circuit without direct contact with the glass batch and forced to circulate and go round within said circuit without direct contact with the glass batch to heat the glass batch indirectly by absorbing heat obtained through the heat exchanger from the hot waste gas and discharging the heat toward the glass batch.

2. A method for making a glass product by using preheated glass batch, said method comprising the steps of:

utilizing hot waste gas discharged from a glass melting furnace before the glass batch is inputted thereto, forming a clean heat medium gas circulating closed circuit by communicating a heat exchanger for recovering waste heat, being located in a waste gas flue and a glass batch preheater; and enclosing in said circuit clean heat medium gas having a heat radiation intensity in an infrared ray wavelength range as heat medium, said clean heat medium gas being confined in said circuit without direct contact with the glass batch and forced to circulate and go round within said circuit without direct contact with the glass batch to heat the glass batch indirectly while absorbing heat obtained through the heat exchanger from the hot waste gas and discharging the heat toward the glass batch.

3. The method for preheating glass batch as defined in claim 1 wherein said clean heat medium gas includes carbon dioxide.

4. The method for preheating glass batch as defined in claim 1 wherein said clean heat medium gas includes water vapor.

5. The method for making a glass product as defined in claim 2 wherein said clean heat medium gas includes carbon dioxide.

6. The method for making a glass product as defined in claim 2 wherein said clean heat medium gas includes water vapor.

* * * * *